(12) United States Patent
Chen (10) Patent No.: US 9,508,319 B2
(45) Date of Patent: Nov. 29, 2016

(54) DISPLAY AND METHOD FOR DISPLAYING VIDEO FRAMES THEREOF

(71) Applicant: Wistron Corporation, New Taipei (TW)

(72) Inventor: Feng-Yuan Chen, New Taipei (TW)

(73) Assignee: Wistron Corporation, New Taipei (TW)

( * ) Notice: Subject to any disclaimer, the term of this patent is extended or adjusted under 35 U.S.C. 154(b) by 34 days.

(21) Appl. No.: 14/297,593

(22) Filed: Jun. 5, 2014

(65) Prior Publication Data

US 2015/0269912 A1 Sep. 24, 2015

(30) Foreign Application Priority Data

Mar. 18, 2014 (TW) .............................. 103110127 A (51) Int. Cl.
*G09G 5/12* (2006.01)
*G06F 3/14* (2006.01)

(52) U.S. Cl.
CPC ............... *G09G 5/12* (2013.01); *G06F 3/1446* (2013.01); *G09G 2290/00* (2013.01); *G09G 2300/026* (2013.01); *G09G 2320/0613* (2013.01); *G09G 2340/0407* (2013.01); *G09G 2352/00* (2013.01);
(Continued)

(58) Field of Classification Search
CPC ............. G09G 5/006; G09G 2370/12; G09G 2370/04; G09G 2370/042; G09G 2350/00; G09G 2370/045; G09G 5/003; G09G 2360/02; G09G 2320/103; G09G 2340/0407; G09G 2352/00; G09G 5/005; G09G 5/12; G09G 2300/0413; G09G 2300/0439; G09G 2300/0443; G09G 2300/0447; G09G 2300/0452; G09G 2300/0456; G09G 2300/046; G09G 2300/0465; G09G 2300/0469; G09G 2300/0473; G09G 2300/0486; G09G 2300/0491; G09G 2300/04

USPC .......................................................... 345/204
See application file for complete search history.

(56) References Cited

U.S. PATENT DOCUMENTS

2007/0239913 A1* 10/2007 Knepper ............... G06F 3/1415
710/104
(Continued)

FOREIGN PATENT DOCUMENTS

TW 200807383 2/2008

OTHER PUBLICATIONS

"Office Action of Taiwan Counterpart Application," issued on Jan. 14, 2016, with English translation thereof, p. 1-p. 10.

*Primary Examiner* — Grant Sitta
(74) *Attorney, Agent, or Firm* — Jianq Chyun IP Office (57) ABSTRACT

A display and a method for displaying video frames thereof are provided. In the method, a connection state between a first port, a second port and a source device is detected. When only one port is connected to the source device, an original resolution data is provided to the source device through the port and a video streaming transmitted from the source device is received. The video streaming is divided and respectively outputted to the display by a first display controller and a second display controller. When the first port and the second port are both connected to the source device, two adjusted resolution data are provided to the source device through the first port and the second port respectively, and two video streamings transmitted from the source device are received and outputted to the display by the first display controller and the second display controller respectively.

14 Claims, 8 Drawing Sheets

(52) U.S. Cl.
CPC ...... *G09G 2360/02* (2013.01); *G09G 2360/06* (2013.01); *G09G 2370/042* (2013.01)

(56) References Cited

U.S. PATENT DOCUMENTS

| | | | |
|---|---|---|---|
| 2008/0018580 A1 | 1/2008 | Chou | |
| 2009/0182917 A1* | 7/2009 | Kim | G06F 3/1431 710/106 |
| 2009/0289946 A1* | 11/2009 | Goodart | G06F 3/1438 345/520 |
| 2010/0013840 A1* | 1/2010 | Hunkins | G06F 3/14 345/502 |
| 2012/0215950 A1* | 8/2012 | Anderson | G06F 13/385 710/33 |

\* cited by examiner

DISPLAY AND METHOD FOR DISPLAYING VIDEO FRAMES THEREOF

CROSS-REFERENCE TO RELATED APPLICATION

This application claims the priority benefit of Taiwan application serial no. 103110127, filed on Mar. 18, 2014. The entirety of the above-mentioned patent application is hereby incorporated by reference herein and made a part of this specification.

BACKGROUND OF THE DISCLOSURE

1. Field of the Disclosure

The disclosure relates to a display and a display method thereof, and particularly relates to a display and a display method that supports receiving a video streaming with one or two ports to display video frames.

2. Description of Related Art

With the development of the display technology, the image quality of displays constantly increases, and the video streaming data to be transmitted to the display also constantly increases. Therefore, the transmission bandwidth provided by one single video line is no longer sufficient for its purpose. Therefore, a double video line configuration is developed for the displays nowadays as the framework of video transmission. The bandwidth limitation of the single video line is overcome by adding the usable transmission bandwidth.

In video transmission using double video lines nowadays, two scalers in the display respectively receive video streamings provided by the source device through two video ports, and the frames of the two video streamings are displayed in parallel at the left half and the right half of the display.

However, the display does not always need a frame in a high quality. For example, when the display displays a text file, the transmission bandwidth of one single video line is enough to display the frame of the file. However, the displays on the market are currently not able to provide an appropriate information to the source device when switching between the video ports, making the source device not able to adjust the configuration and resolution of the video streaming that is provided. Thus, the frame displayed may be compressed or deformed.

SUMMARY OF THE DISCLOSURE

In view of the above, the disclosure provides a display and a method for displaying video frames thereof that are capable of dynamically detecting a connection state of a video port of a display and adjusting a configuration and resolution of a video streaming that is provided, so as to display the best video quality.

A method for displaying video frames according to the invention is adapted for a display having a first port, a second port, a first display controller, and a second display controller. The first display controller and the second display controller are respectively connected with the first port and the second port. The method detects a connection state between the first port, the second port, and a source device. When it is detected that one port of the first and second ports is connected with the source device, an original resolution data of the display is provided to the source device through the port and a video streaming transmitted from the source device in response to the original resolution data is received. In addition, the video streaming is divided up, so as to respectively output the video streaming to the display for display by the first display controller and the second display controller. When it is detected that the first and second ports are both connected with the source device, two adjusted resolution data are respectively provided to the source device through the first and second ports and two video streamings transmitted from the source device in response to the adjusted resolution data are received, so as to respectively output the two video streamings to the display for display by the first display controller and the second display controller. A resolution of the adjusted resolution data is half of a resolution of the original resolution data.

The display of the disclosure includes a display panel, a memory, a first port, a second port, a first display controller, and a second display controller. The memory stores an original resolution of the display panel. The first port and the second port are respectively connected to the source device through a video transmission line, so as to receive at least one video streaming transmitted from the source device through the video transmission line. The first display controller is coupled with the display panel, the memory, and the first port, and detects a connection state between the first port and the source device. The second display controller is coupled with the display panel, the memory, the second port, and the first display controller, and detects the connection state between the second port and the source device. When it is detected that one port of the first and second ports is connected with the source device, the first display controller or the second display controller connected to the port provides an original resolution data of the display to the source device through the port and receives a video streaming transmitted from the source device in response to the original resolution data, and divides up the video streaming to respectively output the video streaming to the display panel for display by the first display controller and the second display controller. When it is detected that the first and second ports are both connected with the source device, the first display controller and the second display controller respectively provide two adjusted resolution data to the source device through the first and second ports and receive two video streamings transmitted from the source device in response to the adjusted resolution data, so as to respectively output the two video streamings to the display panel for display. A resolution of the adjusted resolution data is half of a resolution of the original resolution data.

In order to make the aforementioned and other features and advantages of the disclosure comprehensible, several exemplary embodiments accompanied with figures are described in detail below.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DESCRIPTION OF THE EMBODIMENTS

Reference will now be made in detail to the present preferred embodiments of the invention, examples of which are illustrated in the accompanying drawings. Wherever possible, the same reference numbers are used in the drawings and the description to refer to the same or like parts.

A display port (hereinafter DP) is a video transmission interface using a micro-packet architecture and capable of providing multi-stream transport (MST). In the embodiments of the invention, a resolution data is provided to a source device based on a connection state between each connection port and the source device, and the technologies above are utilized to transmit a video streaming corresponding to the resolution data provided by the source device to a display through one or two video transmission lines. Accordingly, the display may automatically respond to a way of connection of the video transmission lines to display the best video quality without having a configuration set manually.

Figure 1:
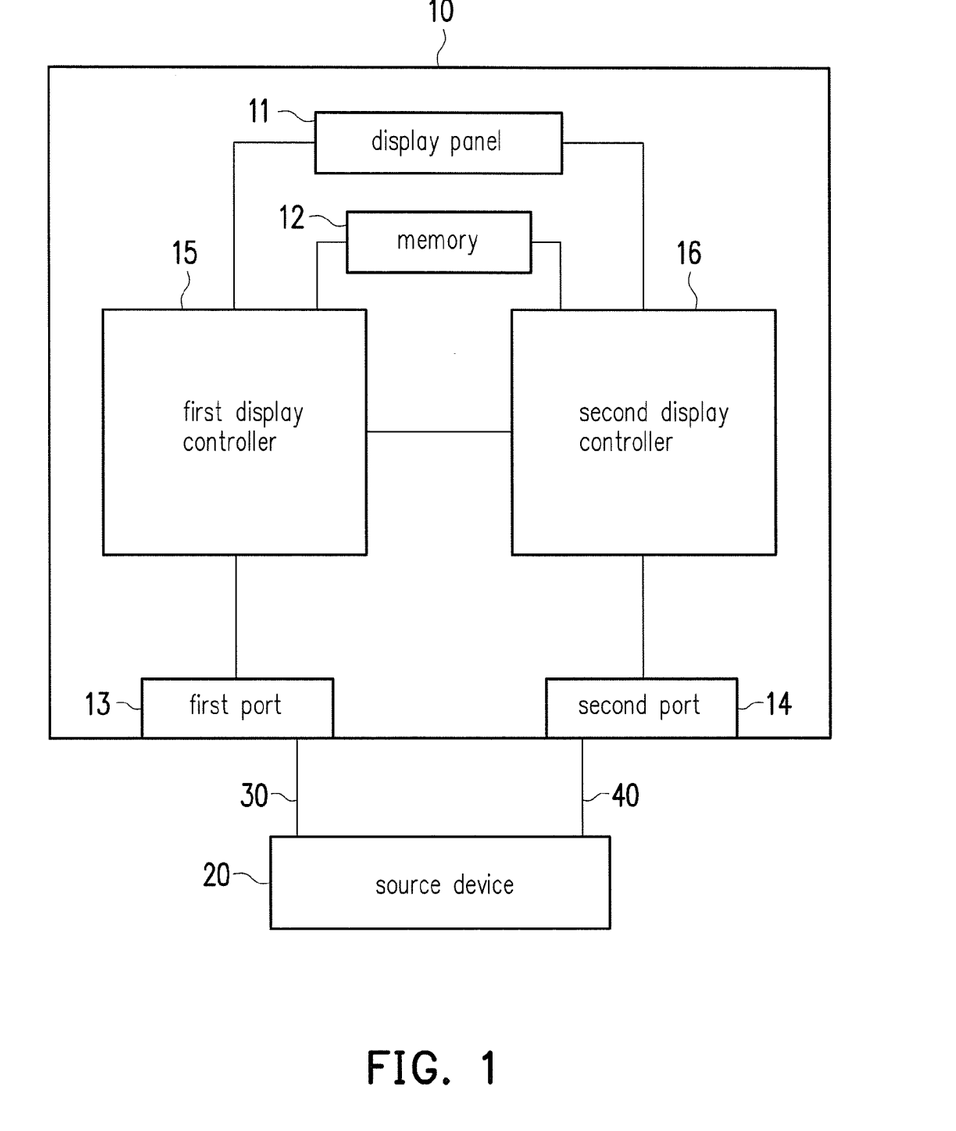
FIG. 1 is a block diagram illustrating a display according to an embodiment of the disclosure.

FIG. 1 is a block diagram illustrating a display 10 according to an embodiment of the disclosure, wherein a connection relation between the display 10 and a source device 20 is illustrated as well. Referring to FIG. 1, the display 10 includes a display panel 11, a memory 12, a first port 13, a second port 14, a first display controller 15, and a second display controller 16. The display 10 is a liquid crystal display (LCD), a light-emitting diode (LED) display, a field emission display (FED), or other kinds of displays, for example. The source device 20 may be a computer that supports multi-stream transport of different DP standards (e.g. DP 1.2) or other electronic devices that provide video streaming. The disclosure does not intend to limit the types of displays and source devices herein.

The display panel 11 may be a liquid crystal display panel, light-emitting display panel, field emission display panel, or other kinds of display panels, for example. The memory 12 is, for example, any kind of fixed or movable random access memory (RAM), read-only memory (ROM), flash memory, similar components or a combination thereof, which may be used to store an original resolution of the display panel 11 (i.e. an original resolution of the display 10). In this embodiment, the memory 12 stores a plurality of extended display identification data (EDID), for example. In addition, the data may respectively record a resolution data of each video streaming in the multi-stream transport, for example. It should be noted that in this embodiment, the memory 12 is disposed independently from the first display controller 15 and the second display controller 16, while in another embodiment, a memory 14 may be respectively disposed in the first display controller 15 and the second display controller 16, so as to provide extended display identification data as required.

The first port 13 and the second port 14 may be transmission interfaces that are compatible with DP 1.2 and support multi-stream transport. Alternatively, the first port 13 and the second port 14 may be other transmission interfaces that provide multi-stream transport. The invention is not limited thereto. The first port 13 and the second port 14 may be a video graphic array (VGA) port or a high definition multimedia interface (HDMI) port, for example. However, the disclosure is not limited thereto. In this embodiment, the first port 13 and the second port 14 may simultaneously transmit two video streamings in a double-line configuration through the function of multi-stream transport provided by DP 1.2. Thus, the display 10 of this embodiment may use a video transmission line 30 and a video transmission line 40 to be respectively connected with the source device 20, so as to receive at least one video streaming transmitted from the source device 20 through the video transmission line 30 and the video transmission line 40.

The first display controller 15 and the second display controller 16 may be a scaler controller or other controllers providing a frame-scaling function. In this embodiment, the first display controller 15 and the second display controller 16 are respectively coupled with the display panel 11 and the memory 12. The first display controller 15 is further coupled with the first port 13 to detect a connection state between the first port 13 and the source device 20. The second display controller 16 is further coupled with the second port 14 and the first display controller 15, so as to detect a connection state between the second port 14 and the source device 20.

Figure 2:
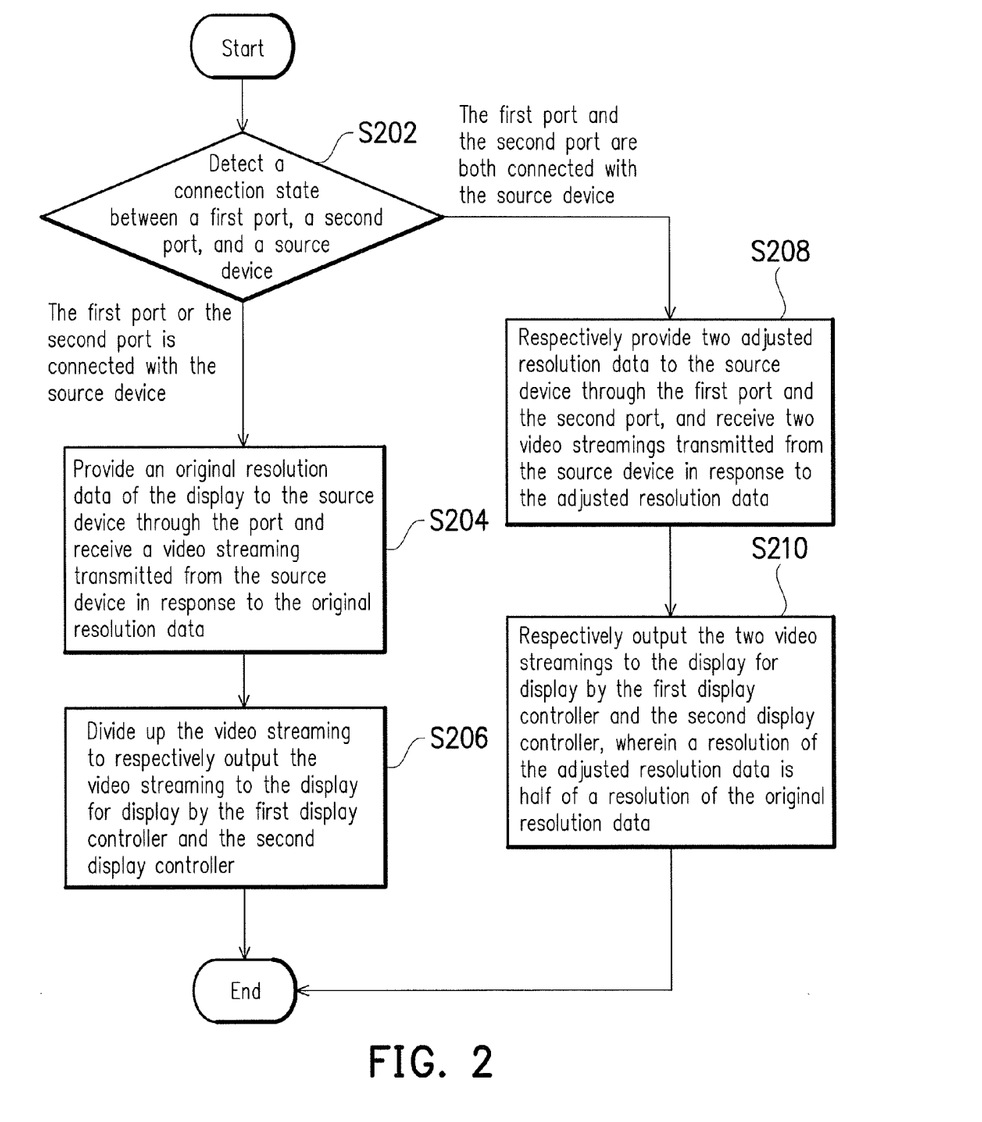
FIG. 2 is a flowchart illustrating a method for displaying video frames according to an embodiment of the disclosure.

FIG. 2 is a flowchart illustrating a method for displaying video frames according to an embodiment of the invention. Referring to FIGS. 1 and 2 simultaneously, the method of this embodiment is suitable for the display 10. Details of processes in the method of this embodiment are described in detail below with reference to the components of the display 10 shown in FIG. 1.

At Step S202, the first display controller 15 and the second display controller 16 may respectively detect a connection state between the first port 13, the second port 14 and the source device 20. More specifically speaking, when the display 10 is activated (e.g. turning on the power), the first display controller 15 and the second display controller 16 may continuously detect whether the first port 13 and the second port 14 are connected to the video transmission line 30 and the video transmission line 40, so as to determine a connection state between the display 10 and the source device 20.

When one port of the first port 13 and the second port 14 is connected with the source device 20, at Step S204, the first display controller 15 or the second display controller 16 may provide the source device 20 with the original resolution data of the display 10 through the port connected with the source device 20, and then the first display controller 15 or the second display controller 16 may receive a video streaming transmitted from the source device 20 in response to the original resolution data. Specifically speaking, when there is only one port (the first port 13 or the second port 14) connected with the source device 20, the display controller (the first display controller 15 or the second display controller 16) corresponding to the port may provide the source device 20 with the original resolution data of the display 10 stored in the memory 14 through the port. The original resolution data is an extended display identification data (EDID), for example. Accordingly, the display controller may notify the source device that under a circumstance that only one video transmission line (the video transmission line 30 or the video transmission line 40) is in connection, a resolution suitable for the video streaming being transmitted is the original resolution of the display 10. Then, the display controller may receive the video streaming transmitted from the source device 20 in response to the original resolution data.

Then, at Step S206, the display controller that receives the video streaming (the first display controller 15 or the second display controller 16) then divides up the received video streaming, such that the video streaming is respectively output to the display 10 by the first display controller 15 and the second display controller 16.

Specifically speaking, in one embodiment, the display controller that receives the video streaming may, based on a built-in frame configuration information of the display controller, output a half frame of the video streaming to the display 10, and transmit the video streaming to the other display controller, such that the other display controller may, based on the built-in frame configuration information of the other display controller, output the other half frame of the video streaming to the display 10.

Figure 3:
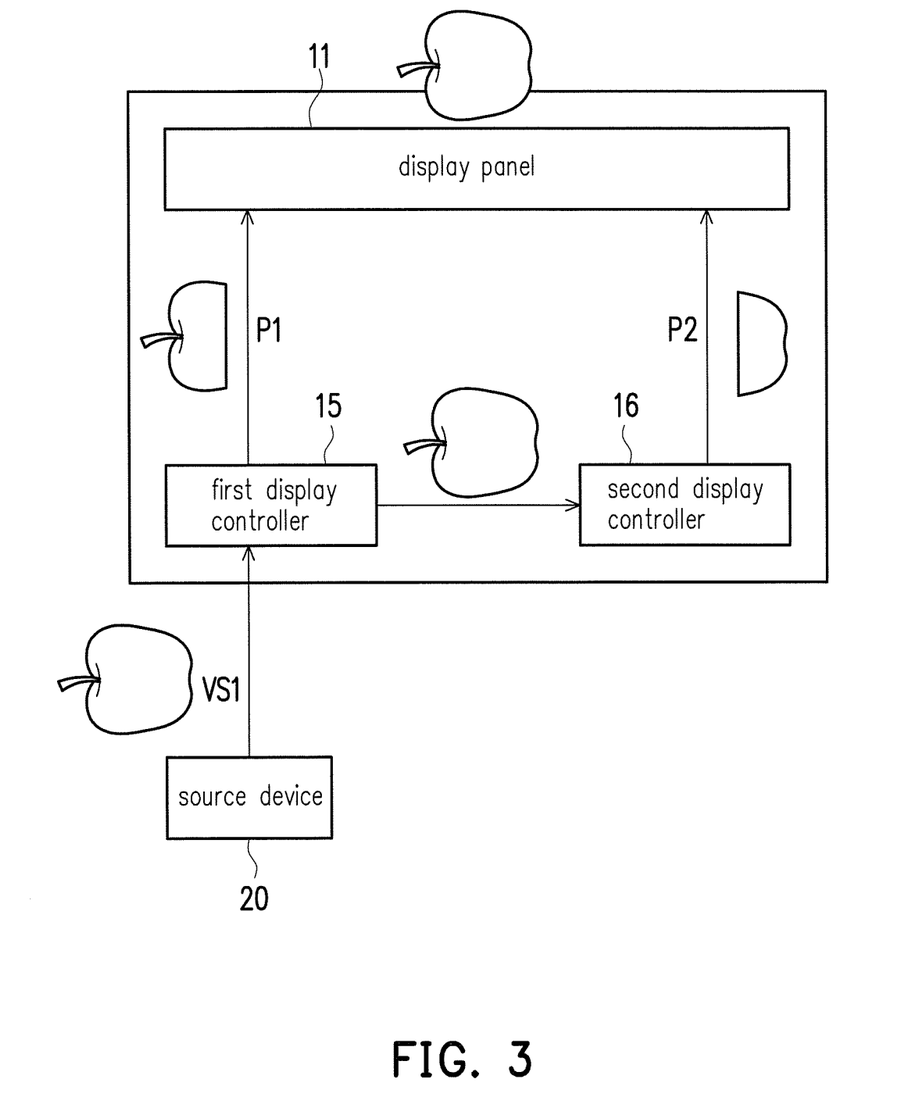
FIG. 3 is a view illustrating an example of a method for displaying video frames according to an embodiment of the disclosure.

For example, FIG. 3 is a view illustrating an example of a method for displaying video frames according to an embodiment of the disclosure. Referring to FIG. 3, the example is described under a framework of the display 10 shown in FIG. 1. The first display controller 15 may receive a video streaming VS1 output from the source device 20 through a port (not shown). At this time, the first display controller 15 may output a left-half frame P1 of the video streaming VS1 to the display panel 11 based on the built-in frame configuration information of the first display controller 15. In addition, the first display controller 15 may further transmit the video streaming VS1 to the second display controller 16. The second display controller 16 also outputs a right-half frame P2 of the video streaming VS1 to the display panel 11 based on the built-in frame configuration information of the second display controller 16. Thus, a complete frame of the video streaming VS1 may be displayed on the display panel 11.

In another embodiment, a display controller that receives an video streaming may transmit the video streaming of the other half frame to the other display controller in addition to outputting a half frame of the video streaming to the display 10 based on the built-in frame configuration information of the display controller. The other display controller outputs the other half-frame of the video streaming to the display panel 10 based on the built-in frame configuration information of the other display controller.

Figure 4:
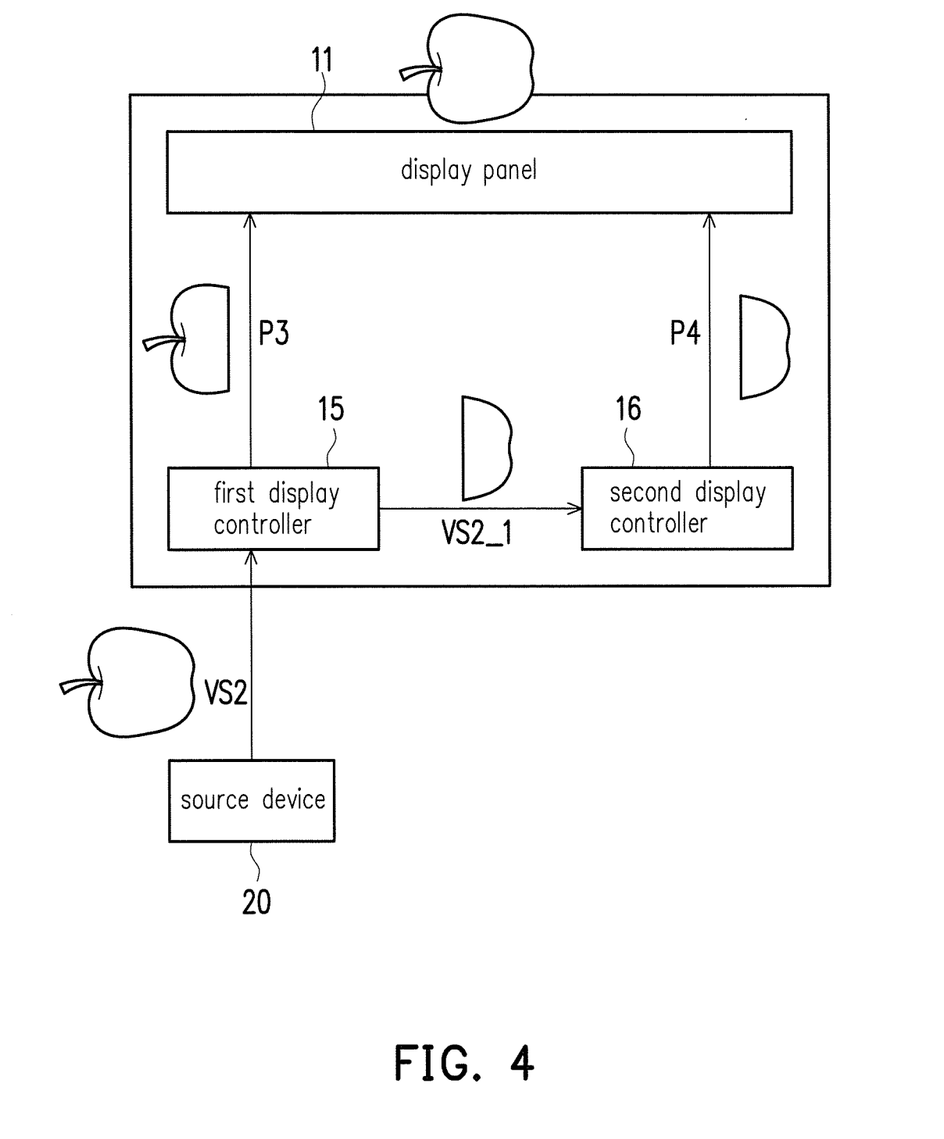
FIG. 4 is a view illustrating an example of a method for displaying video frames according to an embodiment of the disclosure.

For example, FIG. 4 is a view illustrating an example of a method for displaying video frames according to an embodiment of the disclosure. Referring to FIG. 4, the example is described under a framework of the display 10 shown in FIG. 1. The first display controller 15 may receive a video streaming VS2 output from the source device 20 through a port (not shown). At this time, the first display controller may output a left-half frame P3 of the video streaming VS2 to the display panel 11 based on a frame configuration information. In addition, the first display controller 15 may further transmit a video streaming VS2_1 of a right-half frame to the second display controller 16. The second display controller 16 may also output a right-half frame P4 of the video streaming VS2 (i.e. a video frame of the video streaming VS2_1) to the display panel 11. Thus, a complete frame of the video streaming VS2 may also be displayed on the display panel 11. It should also be noted that the frame configuration information may also be provided by the source device 20, instead of being built in the first display controller 15 or the second display controller 16. The disclosure is not limited thereto.

Back to the processes shown in FIG. 2, when the first port 13 and the second port 14 are connected with the source device 20, at Step S208, the first display controller 15 and the second display controller 16 provide two adjusted resolution data to the source device 20 through the first port 13 and the second port 14 respectively, and respectively receive two video streamings transmitted from the source device 20 in response to the adjusted resolution data. Specifically speaking, when the first port 13 and the second port 14 are both connected with the source device 20, the first display controller 15 and the second display controller 16 may provide the two adjusted resolution data to the source device 20 through the respective ports. The adjusted resolution data is an extended display identification data, for example. And a resolution recorded therein is half of a resolution of the original resolution data. Each of the display controllers may notify the source device 20 of a resolution (i.e. the adjusted resolution) suitable for the video streaming under a circumstance that two video transmission lines (the video transmission line 30 and the video transmission line 40) are in connection. Then, the first display controller 15 and the second display controller 16 may respectively receive the video streamings transmitted from the source device 20 in response to the adjusted resolution data.

Then, at Step S212, the first display controller 15 and the second controller 16 may respectively output the video streamings that are received to the display 10 for display. In addition, since the resolution of the adjusted resolution data is half of the resolution of the original resolution data, the video streamings output to the display panel 11 through the first display controller 15 and the second display controller 16 (each corresponds to a half frame) may be formed into a complete frame.

Figure 5:
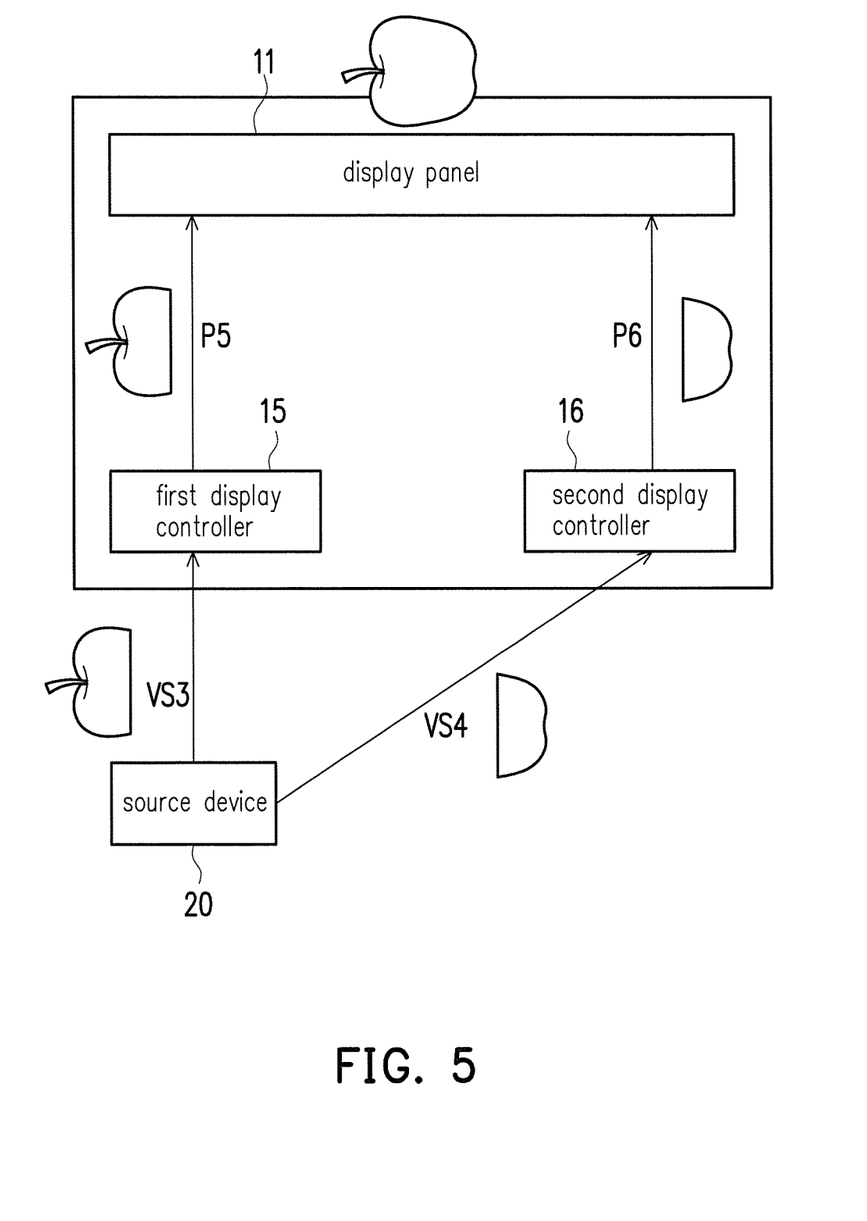
FIG. 5 is a view illustrating an example of a method for displaying video frames according to an embodiment of the disclosure.

For example, FIG. 5 is a view illustrating an example of a method for displaying video frames according to an embodiment of the disclosure. Referring to FIG. 5, the example is described under a framework of the display 10 shown in FIG. 1. The first display controller 15 and the second display controller 16 may respectively receive a video streaming VS3 and a video streaming VS4 output from the source device 20 through the first port 13 and the second port 14. At this time, the first display controller 15 and the second display controller 16 may, based on frame configuration information that are built in the first display controller 15 and the second display controller 16 or provided by the source device 20, respectively output a frame P5 of the video streaming VS3 and a frame P6 of the video streaming VS4 to the display panel 11. Thus, by displaying frames of the video streamings VS3 and VS4 in parallel on the display panel 11, a completely frame may be formed.

It should be noted that in one embodiment, a general-purpose interface may be configured to synchronize the connection state between the first display controller and the second display controller. Namely, when any one of the display controllers determines that the connection state with the corresponding port is changed, the display controller may notify the other display controller through the general-purpose interface, so as to re-establish a connection with the source device. In addition, a display interface may be utilized for video streaming transmission between the first display controller and the second display controller. To allow people having ordinary skills in the art to better appreciate the disclosure, another embodiment is provided below for description of further details.

Figure 6:
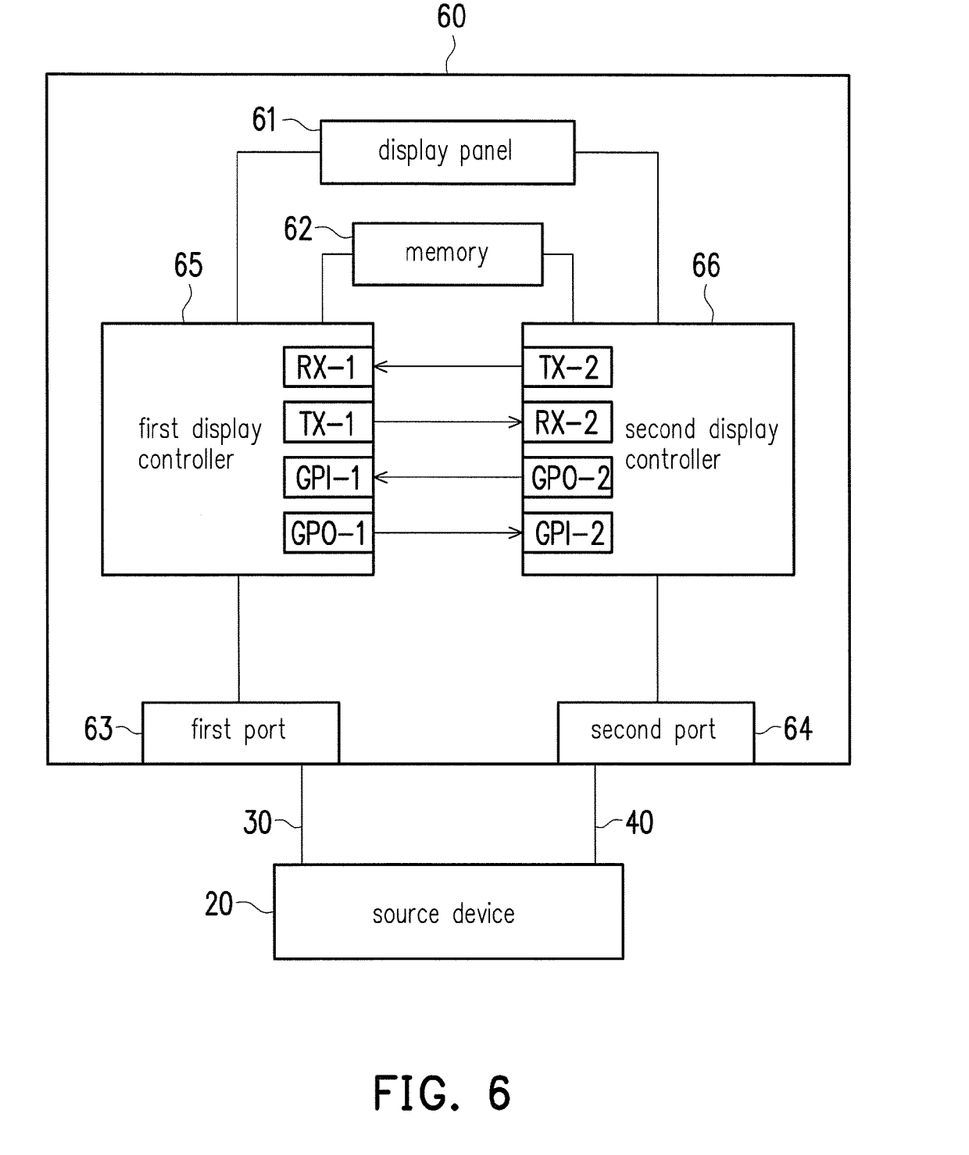
FIG. 6 is a block diagram illustrating a display according to an embodiment of the disclosure.

FIG. 6 is a block diagram illustrating a display according to an embodiment of the disclosure, wherein a connection relation between a display 60 and the source device 20 is illustrated as well. Referring to FIG. 6, the display 60 includes a display panel 61, a memory 62, a first port 63, a second port 64, a first display controller 65, and a second display controller 66. Functions of the components above are the same as or similar to functions of the corresponding components in the previous embodiments. Thus, details in this respect will not be reiterated below.

What differs from the embodiments above is that in this embodiment, the first display controller 65 and the second display controller 66 are connected through a general-purpose interface and a display interface. The general-purpose interface may be an interface such as a general purpose input output (GPIO) or an inter-integrated circuit (I2C), etc. The invention is not limited thereto. Referring to FIG. 6, in this embodiment, general-purpose interface ports GPI-1 and GPO-1 are disposed on the first display controller 65, while general-purpose interface ports GPI-2 and GPO-2 are disposed on the second display controller 66. The connection state of the two display controllers may be synchronized through connection between the general-purpose interface ports.

Besides, the display interface is a display port (DP) interface chained using a Daisy chain, for example. Referring to FIG. 6, in this embodiment, display interface ports RX-1 and TX-1 are disposed on the first display controller 65, and display interface ports RX2 and TX2 are disposed on the second display controller 66. Accordingly, the two display controllers may transmit a video streaming to each other through a connection between the display interface ports.

Figure 7:
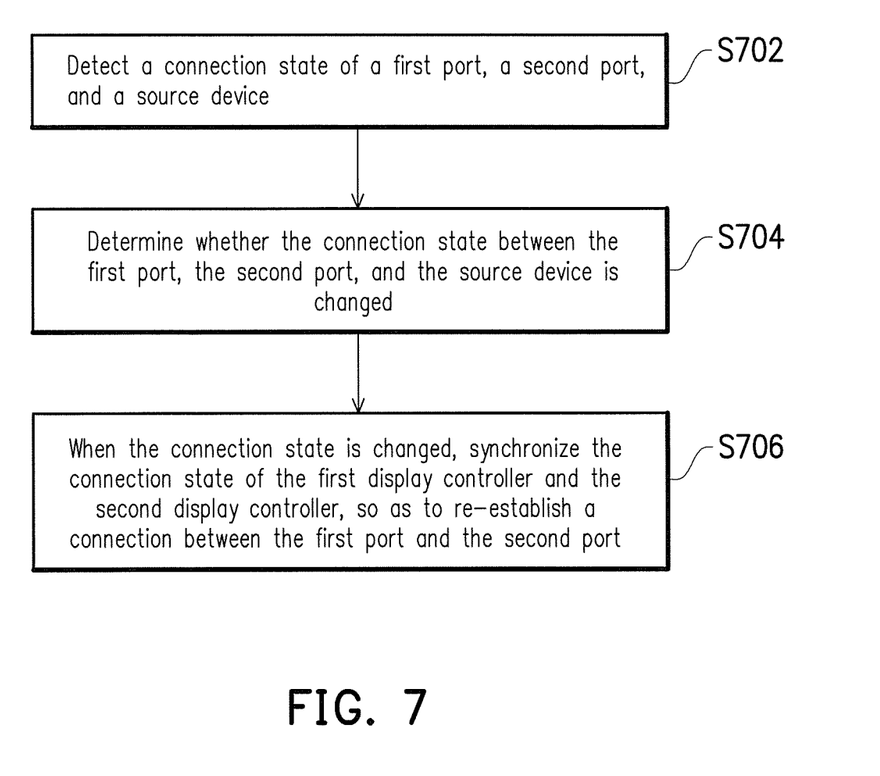
FIG. 7 is a flowchart illustrating a method for displaying video frames according to an embodiment of the disclosure.

FIG. 7 is a flowchart illustrating a method for displaying video frames according to an embodiment of the disclosure. Referring to FIGS. 6 and 7 simultaneously, the method of this embodiment is suitable for the display 60. Details of processes in the method of this embodiment are described in detail below with reference to the components of the display 60 shown in FIG. 6.

At Step S702, the first display controller 65 and the second display controller 66 may respectively detect a connection state between the first port 63, the second port 64 and the source device 20. Step S702 described herein is the same as or similar to Step S202 described in the previous embodiment. Thus, details in this respect will not be reiterated below.

What differs from the previous embodiment is that in this embodiment, the first display controller 65 and the second display controller 66 respectively determine whether the connection state between the first port 63 and the second port 64 and the source device 20 are changed at Step S704.

At Step 706, when the first display controller 65 or the second display controller 66 detects that the connection state of the first display controller 65 or the second display controller 66 with the source device 20 is changed, the first display controller 65 or the second display controller 66 may then synchronize the connection state of the first display controller 65 and the second display controller 66 through the general purpose interface connecting each other, so as to re-establish a connection with the source device 20 through the first port 63 and the second port 64. For example, when the first display controller 65 detects that the video transmission line 30 is newly inserted into the first port 63, and the first port 63 is connected with the source device 20 through the video transmission line 30, the first display controller 65 may provide the changed connection state to the general-purpose interface port GPI-2 of the second display controller 66 through the general-purpose interface port GPO-1, such that the connection state recorded by the second display controller 66 is synchronized with the connection state of the first display controller 65. Similarly, when the second display controller 66 detects that the video transmission line 40 is newly inserted into the second port 64, and the second port 64 is connected with the source device 20 through the video transmission line 40, the second display controller 66 then provides the changed connection state to the general-purpose interface port GPI-1 of the first display controller 65 through the general-purpose interface port GPO-2, such that the connection state recorded by the first display controller 65 is synchronized with the connection state of the second display controller 66. When the connection state is synchronized with respect to each other, the first display controller 65 and the second display controller 65 may generate a hot-swapping signal to notify the source device 20, so as to re-establish the connection with the source device 20. A way of establishing the connection is the same as that in FIG. 2 of the previous embodiment. Therefore, details in this respect will not be reiterated below.

It should be noted that in the above embodiments, the two display controllers of the display transmit the video streamings through the two display interface ports. However, in another embodiment, a multiplexer may be disposed between a port and a display controller, so as to transmit a video streaming by using one display interface port. Another embodiment is described below to provide further details in this respect.

Figure 8:
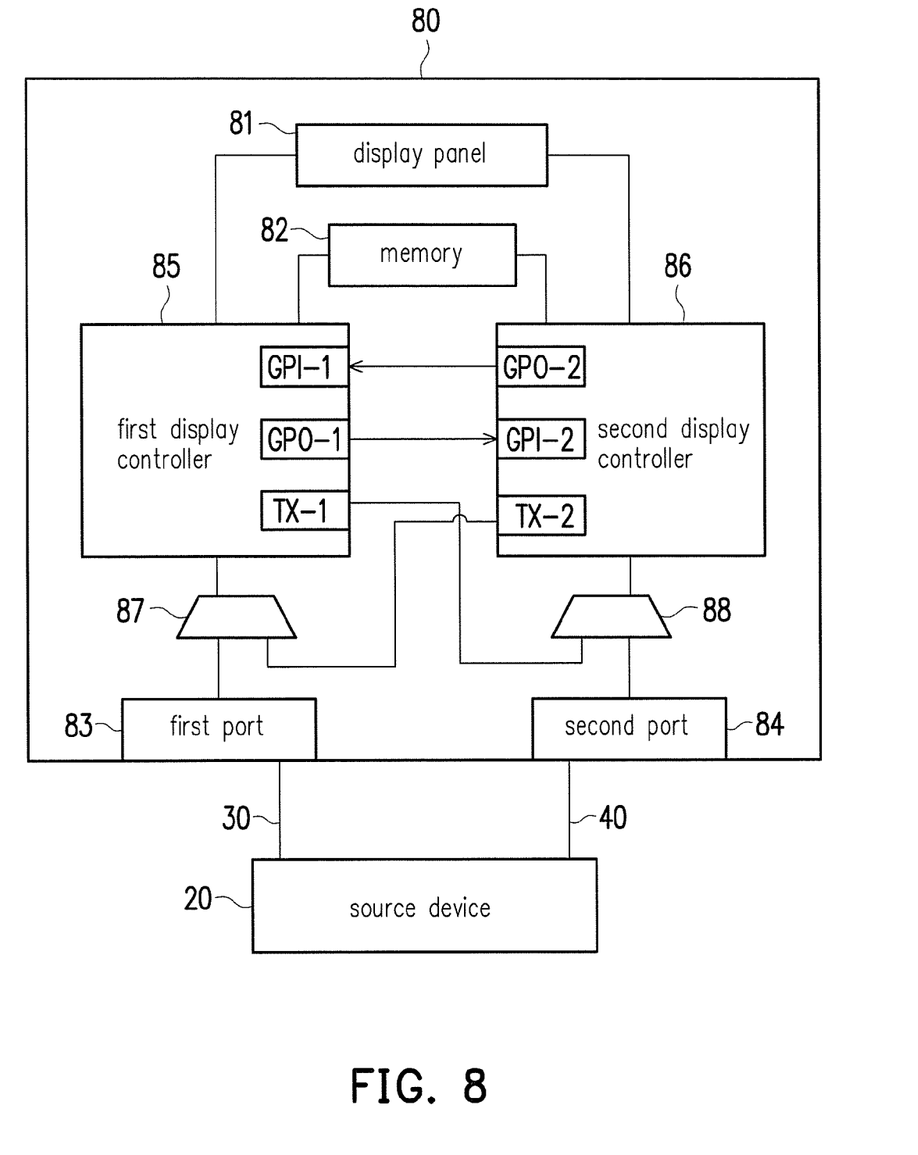
FIG. 8 is a block diagram illustrating a display according to an embodiment of the disclosure.

FIG. 8 is a block diagram illustrating a display 80 according to an embodiment of the disclosure, wherein a connection relation between the display 80 and a source device 20 is illustrated as well. Referring to FIG. 8, the display 80 includes a display panel 81, a memory 82, a first port 83, a second port 84, a first display controller 85, and a second display controller 86. Most of the components are the same or similar to those in the embodiments above. Therefore, details in this respect will not be reiterated below.

What differs from the embodiments above is that the display 80 further includes a first multiplexer 87 and a second multiplexer 88. In addition, the first multiplexer 87 is coupled with the first port 83, the first display controller 85, and a display interface port TX-2 of the second display controller 86 to receive video streaming output from the first port 83 and the display interface port TX-2 of the second display controller 86 and output the video streaming to the first display controller 85. Similarly, the second multiplexer 88 is coupled with the second port 84, the second display controller 86, and a display interface port TX-1 of the first display controller 85 to receive video streaming output from the second port 84 and the display interface port TX-1 of the first display controller 85 and output the video streaming to the second display controller 86. In this embodiment of the invention, the first display controller 85 and the second display controller 86 only need to be disposed with one display interface port to meet a streaming transmission requirement.

In view of the foregoing, the display and the method for displaying the video frames thereof are capable of dynamically detecting the connection state of the video port of the display and provide the resolution data corresponding to the current connection state to the source device. Thus, the source device may provide the video streaming with an appropriate resolution to the display, and the display may as well correspondingly dispatch the video streaming to the two display controllers to process and output to the display panel, so as to present the complete frame of the video streaming.

It will be apparent to those skilled in the art that various modifications and variations can be made to the structure of the present invention without departing from the scope or spirit of the disclosure. In view of the foregoing, it is intended that the present disclosure cover modifications and variations of this invention provided they fall within the scope of the following claims and their equivalents.

What is claimed is:

1. A method for displaying video frames, adapted for a display having a first port, a second port, a first display controller, and a second display controller, wherein the first display controller and the second display controller are respectively connected with the first port and the second port, the method comprising:
   dynamically detecting a connection state between the first port, the second port, and a source device;
   when it is detected that one port of the first and second ports is connected with the source device, providing an original resolution data of the display to the source device through the port and receiving a video streaming transmitted from the source device in response to the original resolution data, and dividing up the video streaming to respectively output the video streaming to the display for display by the first display controller and the second display controller; and
   when it is detected that the first and second ports are both connected with the source device, respectively providing two adjusted resolution data to the source device through the first and second ports and receiving two video streamings transmitted from the source device in response to the adjusted resolution data, and respectively outputting the two video streamings to the display for display by the first display controller and the second display controller, wherein a resolution of the adjusted resolution data is half of a resolution of the original resolution data,
   wherein dividing up the video streaming to respectively output the video streaming to the display for display by the first display controller and the second display controller comprises:
   outputting a half frame of the video streaming by one display controller of the first display controller or the second display controller to the display for display based on a built-in frame configuration information of the display controller, and transmitting the video streaming to the other display controller through a display interface directly connecting the first and second display controller together; and
   outputting the other half frame of the video streaming by the other display controller to the display for display based on a built-in frame configuration information of the other display controller.

2. The method for displaying the video frames as claimed in claim 1, wherein after detecting the connection state between the first port, the second port, and the source device, the method further comprises:
   determining whether the connection state between the first port, the second port, and the source device is changed; and
   when the connection state is changed, synchronizing the connection state of the first display controller and the second display controller, so as to re-establish a connection with the source device through the first and second ports.

3. The method for displaying the video frames as claimed in claim 1, wherein the frame configuration information is built in the first display controller or the second display controller or provided by the source device.

4. The method for displaying the video frames as claimed in claim 1, wherein respectively outputting the two video streamings to the display for display by the first display controller and the second display controller comprises:
   outputting the two video streamings to the display for display by the first display controller and the second display controller respectively based on the frame configuration information that is built in the first and second display controllers or provided by the source device.

5. The method for displaying the video frames as claimed in claim 1, wherein the first display controller and the second display controller respectively transmit the video streaming through the display interface chained using a Daisy chain.

6. The method for displaying the video frames as claimed in claim 1, wherein the display further comprises a first multiplexer coupled with the first port, the first display controller, and a second display interface port of the second display controller and a second multiplexer coupled with the second port, the second display controller, and a first display interface port of the first display controller, wherein
   when the first multiplexer receives the video streaming output by the first port or the second display interface port of the second display controller, outputting the video streaming to the first display controller, and
   when the second multiplexer receives the video streaming output by the second port or the first display interface port of the first display controller, outputting the video streaming to the second display controller.

7. The method for displaying the video frames as claimed in claim 1, wherein the original resolution data and the adjusted resolution data are extended display identification data (EDID).

8. A display, comprising:
   a display panel;
   a memory, storing an original resolution of the display panel;
   a first port and a second port, respectively connected to a source device through a video transmission line, so as to receive at least one video streaming transmitted from the source device through the video transmission line;
   a first display controller, coupled with the display panel, the memory, and the first port, and dynamically detecting a connection state between the first port and the source device; and
   a second display controller, coupled with the display panel, the memory, the second port, and the first display controller, and dynamically detecting the connection state between the second port and the source device, wherein
   when it is detected that one port of the first and second ports is connected with the source device, the first display controller or the second display controller connected to the port provides an original resolution data of the display to the source device through the port and receives a video streaming transmitted from the source device in response to the original resolution data, and divides up the video streaming to respectively output the video streaming to the display panel for display by the first display controller and the second display controller; and
   when it is detected that the first and second ports are both connected with the source device, the first display controller and the second display controller respectively provide two adjusted resolution data to the source device through the first and second ports and receive two video streamings transmitted from the source device in response to the adjusted resolution data, so as to respectively output the two video streamings to the display panel for display, wherein a resolution of the adjusted resolution data is half of a resolution of the original resolution data, wherein the first display controller and the second display controller are directly connected through a display interface, wherein when it is detected that one port of the first and second ports is connected with the source device, the first display controller or the second display controller connected with the port outputs a half frame of the video streaming to the display panel for display based on a built-in frame configuration information of the display controller connected with the port and transmits the video streaming to the other display controller through the display interface, and the other display controller outputs the other half frame of the video streaming to the display panel for display based on a built-in frame configuration information of the other display controller.

9. The display as claimed in claim 8, wherein the first display controller and the second display controller are connected through a general-purpose interface, wherein when the first display controller or the second display controller detects that the connection state with the source device is changed, the connection state of the first display controller and the second display controller is synchronized through the general-purpose interface, so as to re-establish a connection with the source device through the first port and the second port.

10. The display as claimed in claim 8, wherein the frame configuration information is built in the first display controller or the second display controller or provided by the source device.

11. The display as claimed in claim 8, wherein when it is detected that the first port and the second port are both connected with the source device, the first display controller and the second display controller respectively output the two video streamings to the display for display based on the frame configuration information that is built in the first and second display controllers or provided by the source device.

12. The display as claimed in claim 8, further comprising:
a first multiplexer, coupled with the first port, the first display controller, and a second display interface port of the second display controller, receiving the video streaming output by the first port and the second display interface port of the second display controller and outputting the video streaming to the first display controller; and
a second multiplexer, coupled with the second port, the second display controller, and a first display interface port of the first display controller, receiving the video streaming output from the second port and the first display interface port of the first display controller and outputting the video streaming to the second display controller.

13. The display as claimed in claim 8, wherein the original resolution data and the adjusted resolution data are extended display identification data (EDID).

14. A method for displaying video frames, adapted for a display having a first port, a second port, a first display controller, and a second display controller, wherein the first display controller and the second display controller are respectively connected with the first port and the second port, the method comprising:
dynamically detecting a connection state between the first port, the second port, and a source device;
when it is detected that one port of the first and second ports is connected with the source device, providing an original resolution data of the display to the source device through the port and receiving a video streaming transmitted from the source device in response to the original resolution data, and dividing up the video streaming to respectively output the video streaming to the display for display by the first display controller and the second display controller,
wherein dividing up the video streaming to respectively output the video streaming to the display for display by the first display controller and the second display controller comprises:
outputting a half frame of the video streaming by one display controller of the first display controller or the second display controller to the display for display based on a built-in frame configuration information of the display controller, and transmitting the video streaming to the other display controller through a display interface directly connecting the first and second display controllers together; and
outputting the other half frame of the video streaming by the other display controller to the display for display based on a built-in frame configuration information of the other display controller.

* * * * *